United States Patent Office 3,650,987
Patented Mar. 21, 1972

3,650,987
CATALYST BASED ON ALUMINUM FLUORIDE FOR THE GASEOUS PHASE FLUORINATION OF HYDROCARBONS
Martino Vecchio, Giovanni Groppelli, and Vittorio Fattore, Milan, Italy, assignors to Montecatini Edison S.p.A., Milan, Italy
No Drawing. Filed July 18, 1969, Ser. No. 843,232
Claims priority, application Italy, July 25, 1968, 19,448/68
Int. Cl. B01j *11/78*
U.S. Cl. 252—442                    2 Claims

ABSTRACT OF THE DISCLOSURE

A catalyst is disclosed for the preparation of fluorinated hydrocarbons via fluorination of chlorofluorination reactions in gaseous phase, the catalyst consisting essentially of aluminum fluoride containing minor quantities of iron, chromium, and preferably also nickel compounds, present in quantities corresponding to the following percentages by weight of the metal (based on the total): from 0.1% to 5% of Fe, from 0.05% to 8.5% of Cr, and up to 5% of nickel. These metals are present, at least partially, in the form of halides, and in particular fluorides, or in the form of oxides or oxy-halides. The catalyst is prepared by adding iron or chromium compounds, and preferably also nickel compounds, in a subdivided form, to aluminum fluoride or alumina, and then subjecting the composition thus obtained to an activation treatment by heating at a temperature between 300° C. and 550° C. for from 0.5–4 hours in a current of nitrogen or air, and then subjecting said composition to a fluorination treatment by heating at 200°–500° C. in an HF current, suitably diluted with inert gases for the thermal control of the reaction, in order to convert, at least partially, the alumina and possibly also the other metal compounds into their respective fluorides. The catalyst thus obtained is employed for the fluorination in gaseous phase at elevated temperatures of halogenated ethanes containing at least one chlorine atom, in order to obtain high yields in fluorinated ethanes having a high degree of symmetry, by means of HF, or for the chlorofluorination in gaseous phase at elevated temperatures of ethylene or partially halogenated ethylenes by means of a mixture of $HF+Cl_2$, in order to obtain fluorinated or chlorofluorinated ethanes with a high degree of symmetry.

The present invention relates to new catalysts for the fluorination in gaseous phase of halogenated hydrocarbons and for the chlorofluorination of ethylene.

These new catalysts are characterized by the fact that they facilitate the formation of greater quantities of symmetrical compounds or of compounds with a relatively higher degree of symmetry than those which are obtained by means of known catalysts. The degree of symmetry in the present case refers to the distribution of the fluorine atoms and it is also understood that a not exactly symmetric compound, such as $CF_2Cl$—$CFCl_2$, has a degree of symmetry greater than that of $CF_3$—$CCl_3$.

Catalysts based on metal compounds for the gaseous phase fluorination of halogenated hydrocarbons are widely known. In particular, British Pat. No. 980,059 suggests a catalyst based on iron oxide and oxides of metals of the rare earths which is alleged to have the property of reducing the secondary disproportionation reactions which generally accompany the fluorination in gaseous phase. From Example 5 of that patent it appears that in the fluorination of 1,1,2 - trifluoro-1,2,2 - trichloroethane a mixture of isomers of $C_2F_4Cl_2$ is obtained which contains 73% of symmetrical $CClF_2$—$CClF_2$. However, one notes a very low transformation yield with respect to the starting material.

The catalyst according to the present invention, in contrast to that of the above cited British patent, has the advantage of being prepared by starting from cheap compounds, and furthermore, in the fluorination of trifluorotrichloroethane it allows one to obtain symmetrical tetrafluorodichloroethane with a much higher yield with reference to the starting material.

The catalyst according to the present invention, in consists of aluminum fluoride containing minor quantities of iron and chromium compounds and preferably also of nickel, which compounds have been uniformly distributed on the aluminum fluoride granules, for instance, by treating the fluoride itself with solutions of salts of the above-mentioned metals.

The quantities of iron, chromium and nickel compounds introduced into the catalytic composition based on aluminum fluoride must be such as to fall within the following limits:

from 0.1% to 5% by weight, on the total, of iron (Fe)
from 0.05% to 8.5% by weight, on the total, of chromium (Cr)
up to 5% by weight, on the total, of nickel (Ni)

Instead of aluminum fluoride for the preparation of the catalyst, one may use alumina which, during a subsequent fluorination treatment of the catalytic composition with gaseous HF, is substantially transformed into the fluoride. When using alumina for the preparation of the catalyst, it will be necessary to employ the iron compounds, the chromium compounds and the nickel compounds in greater proportions, that is, in proportions towards the higher percentages of the above-indicated ranges.

The iron, the chromium and the nickel are introduced into the catalytic composition—based on aluminum fluoride—preferably in the form of solutions of their salts, such as for instance the nitrates and the chlorides, which are absorbed by the aluminum fluoride or by the starting alumina. The composition thus obtained is dried in an oven at about 150° C.

In the preparation of the catalyst one preferably uses iron, chromium and nickel compounds in the form of their halides or other compounds, in particular nitrates, which, after the activation treatments and the fluorination treatments of the catalytic composition, are then at least partially present in the form of the halides, in particular the fluorides, or oxides or oxy-halides.

The catalyst compositions based on aluminum fluoride or alumina, to which have been added the other metal compounds as aforesaid, are then subjected to an activation treatment and subsequently to a fluorination treatment. The activation treatment is carried out by heating up the product in an air or nitrogen current for a period of from 0.5 to 4 hours, and at a temperature between 300° and 550° C. When the catalyst is prepraed by starting from alumina, temperatures relatively greater than those in the case of aluminum fluoride are required.

The fluorination treatment is carried out by heating up the activated product in a current of gaseous HF conveniently diluted with air or nitrogen or other inert gas, and at a temperature between 200° and 500° C.

The catalyst thus obtained, in the form of fine granules, is particularly suited for use in fluid-bed reactors.

In the first example hereinafter the catalyst preparation is carried out starting from alumina, while in the second example it is carried out starting from aluminum fluoride.

It has been observed that the iron may be introduced into the catalytic composition during the fluorination reaction of the hydrocarbons; such a method of operating is illustrated in Examples 6, 7, 8 and 9 below. These working procedures are particularly convenient when one operates at high temperatures. In fact, in such a case the iron halides are rather volatile under the reaction conditions and the catalyst tends to become less selective if it is not supplied with further iron.

When carrying out the fluorination reaction in a reactor made of an alloy containing Fe, Ni, Cr, for example Inconel, owing to the erosion of the alloy during the reaction a portion of the metals of the alloy goes over the aluminum fluoride (or fluorinated alumina). This quantity of metals may already be sufficient for activating the catalytic composition.

The catalyst according to the present invention has proved particularly useful in the following reactions:

(a) Fluorination in gaseous phase with HF, of halogenated ethanes containing at least one chlorine atom, at a temperature between 360° and 500° C., for obtaining fluorinated or chlorofluorinated ethanes with high yields of compounds having a high degree of symmetry with respect to the fluorine atoms. In particular, the fluorination of $CF_2Cl$—$CFCl_2$ whereby high yields of the symmetrical $CF_2Cl$—$CF_2Cl$ product and a reduced isomerization of the starting compound into $CF_3$—$CCl_3$ are obtained.

(b) Chlorofluorination of ethylene in a gaseous phase, with a $Cl_2$+HF mixture, in the presence of recycled halogenated hydrocarbons, at a temperature between 360° and 500° C., for obtaining predominately $C_2F_4Cl_2$ and $C_2F_3Cl_3$ with high percentages of isomers thereof having a high degree of symmetry, that is, $CF_2Cl$—$CF_2Cl$ and $$CF_2Cl-CFCl_2$$

(c) Disproportionation reaction of $CF_2Cl$—$CFCl_2$ in gaseous phase, at a temperature between 360° and 500° C., with the formation of large quantities of the symmetrical $CF_2Cl$—$CF_2Cl$ compound and very small quantities of the $CF_3$—$CCl_3$ isomer.

The use of the catalysts made according to the present invention, in the above-mentioned reactions, is illustrated below in Examples 3, 4, 5, 6, 7, 8 and 9 which are given for purely illustrative purposes.

EXAMPLE 1

Preparation of the catalyst starting from alumina 270 g. of $Fe(NO_3)_3 \cdot 9H_2O$ and 65 g. of $CrCl_3 \cdot 6H_2O$ were dissolved in water at room temperature. This solution was then diluted up to a volume of 340 cc. which corresponds to the total volume of the pores of the alumina to be impregnated.

The solution was then slowly poured onto 1000 g. of grade A[1] Ketjen alumina maintained under slow continuous stirring both during the impregnation as well as for another two hours. Thereafter the solution and the alumina was left to rest for 4 hours and was then dried in an oven at 150° C. for 12 hours.

---

[1] Chemical and physical characteristics of the alumina used:

Ketjen grade A alumina: of spheroidal shape
  Surface area—280 m.²/g.
  Volume of pores—0.45 cc./g.
  Apparent specific weight—0.29 g./cc.

Average composition:                               Percent
  $Al_2O_3$ _____ 97.46
  $SiO_2$ _____ 1.80
  $Na_2O$ _____ 0.06
  $SO_4$ _____ 0.66
  Fe _____ 0.015

Loss at calcination at 450° C. for 4 hours: 20%.
The granulometric distribution of the starting alumina, as determined by means of screens or sieves of the Tyler series, was the following:

Mesh:                                              Percent
  80 _____ 0.61
  100 _____ 3.67
  150 _____ 17.59
  200 _____ 18.71
  270 _____ 20.22
  325 _____ 16.24
  Over 325 _____ 22.92

The impregnated alumina was then poured into a reactor made of Inconel having a diameter of 11 cm. in which, at a fluidizing velocity of about 9 cm./sec., activation with air was carried out. Thereupon fluorination with hydrofluoric acid was carried out according to the following procedure:

Activation: The treated alumina was heated in a stream of air, from 25° C. to 500° C. in 6 hours, then maintained at 500° C. for 30 minutes, and thereafter cooled from 500° to 300° C. in 1 hour, always under air flow.

Fluorination: Heating from 25° C. to 250° C. in 30 minutes under air flow, maintaining at 250° C. for 5 hours in a flow of air +1960 g. of HF, heating from 250° C. to 420° C. in 30 minutes under air flow, maintaining at 420° C. for 2 hr. 30 min. in a flow of air +1300 g. of HF, cooling from 420° C. to 250° in 30 minutes under air flow.

EXAMPLE 2

Preparation of the catalyst starting from $AlF_3$

The catalyst was prepared by pouring the solution of active elements on aluminum fluoride which had the following chemical-physical characteristics:

content of fluorine=64.2%,
and containing the following elements determined by means of an emission spectrograph:

Percent
Be _____ 0.0014
Ca _____ 0.032
Cr _____ 0.005
Cu _____ 0.00019
Ga _____ 0.008
Fe _____ 0.018
Mg _____ 0.0096
Mn _____ 0.0005
Mo _____ 0.0048
Ni _____ 0.005
Si _____ 0.060
Na _____ 0.021
Pb _____ 0.001

By X-ray analysis the catalyst proved to consist of $\alpha$-$AlF_3$ with the presence of $\beta$-$AlF_3$;

It showed the following granulometric distribution, determined by means of a series of Tyler screens:

Mesh:                                              Percent
  120 _____ 5.2
  140 _____ 14.9
  170 _____ 13.4
  200 _____ 16.2
  230 _____ 18.8
  270 _____ 12.8
  325 _____ 12.8
  Over 325 _____ 5.8

On 500 grams of this aluminum fluoride, under continuous slow stirring, was poured the solution of active elements; this latter was prepared by dissolving 41.2 g. of $NiCl_2 \cdot 6H_2O$, 26.6 g. of $CrCl_3 \cdot 6H_2O$ and 37.7 g. of $$Fe(NO_3)_3 \cdot 9H_2O$$

in a minimum quantity of water heated up to 80° C., and by then diluting this solution up to a volume of 80 cc., which corresponds to the total volume of the pores of the aluminum fluoride to be impregnated. The mixture obtained was then left to rest for 4 hrs., after which it was dried at 150° C. for 12 hours.

In an Inconel reactor of 4 cm. diameter was then carried out, at a fluidizing velocity of about 9 cm./sec., the activation with air, and then the fluorination with hydrofluoric acid according to the following procedures:

Activation: the treated aluminum fluoride was heated in a flow of nitrogen from 25° C. to 300° C. in 1 hour, then maintained at 300° C. for 1 hour, and thereafter cooled from 300° C. to 200° C. in 30 minutes, always under nitrogen flow.

Fluorination: maintaining at 200° C. for 1 hour in a flow of nitrogen+150 g. of HF, heating from 200° C.

to 420° C. in 30 minutes under nitrogen flow, maintaining at 420° C. for 30 minutes in a flow of nitrogen+100 g. of HF, cooling from 420° C. to 250° C. in 30 minutes under nitrogen flow.

EXAMPLE 3

Fluorination in gaseous phase of the $CF_2Cl-CFCl_2$

The fluorination reaction in this test was carried out in a nickel reactor containing a catalyst based on aluminum fluoride, with a varying quantity of iron, chromium, nickel, and with an equimolar ratio of the HF and $$CF_2Cl-CFCl_2$$

reactants. The reaction products were washed with water and sodium hydroxide and were then condensed. The composition of the mixture was determined by means of a chromatograph and, as far as the isomers are concerned, by means of the I.R. absorption spectra.

Table 1 records the results of the tests carried out both with the catalyst according to the present invention as well as with other catalysts, in order to establish the characteristic results achieved by the practice of this invention.

EXAMPLE 4

Chlorofluorination of ethylene

Tests of chlorofluorination of ethylene in gaseous phase have been carried out in the presence of catalysts according to this invention as well as in the presence of catalysts different from these, in order to set up a comparison. The results of these tests are recorded below in Table 2.

For this purpose the tests were carried out in a nickel reactor containing catalyst based on aluminum fluoride with varying quantities of iron, nickel, chromium, by introducing into the reactor the $C_2H_4$, $Cl_2$ and HF reactants together with recycled products (chlorofluorinated hydrocarbons) whose composition is reported in Table 3. The reaction product was then subjected to distillation. The tail fraction was recycled into the reactor. The low boiling fraction consisted of a mixture of $C_2F_5Cl$, $C_2F_4Cl_2$ and $C_2F_3Cl_3$. The composition and the ratio between the various isomers are indicated in Table 2.

EXAMPLE 5

Disproportionation and isomerization of $CF_2Cl-CFCl_2$

Through a glass reactor containing the catalyst was passed $CF_2Cl-CFCl_2$ in the gaseous state, at the operational conditions indicated in Table 4. The reaction products were then sent directly into a chromatograph in order to determine the composition.

From the results recorded in Table 4, it will be seen how effective is the simultaneous presence of iron, chromium and nickel in the aluminum fluoride for promoting the disproportionation reaction of the $CF_2Cl-CFCl_2$ with the formation of symmetrical products and for reducing the isomerization to $CCl_3-CF_3$.

EXAMPLES 6 AND 7

600 g. of $Al_2O_3$ were first held in an oven at 120° C. for 12 hours; they were then loaded into an Inconel reactor of 5 cm. diameter, and were then heated up in an air flow to 380° C. At this temperature an equimolar mixture of air and anhydrous hydrofluoric acid was introduced for a period of 10 hours. Thereafter, the mixture was cooled down in an air current and 720 g. of fluorinated alumina were obtained. With this fluorinated alumina chlorofluorination tests on ethylene were then carried out by operating as in Example 4. The active elements were put on the catalyst in the following way: The Fe, by introducing the $FeCl_3$ in the recycle which was injected into the reactor, and the Cr and Ni, by placing AISI 316 bars inside the reactor.

Table 5 records the test conditions, the compositions of the catalyst and the products obtained. Table 6 records the composition of the recycle.

EXAMPLES 8 AND 9

291 g. of $CrCl_3.6H_2O$ were dissolved in about 300 cc. of distilled water. 1500 g. of alumina were impregnated with the solution thus obtained. The product was then dried at 120° C. while stirring and was then left overnight in an oven at 150° C.

Fluorination of the catalyst: The thus-treated alumina was then heated up to 250° C. in a reactor with a diameter of 10 cm. in a flow of air and, on reaching the above-indicated temperature, there was then introduced a mixture of air and HF (30% of HF) for 7 hours.

The total quantity of HF amounted to 2540 g. Thereupon, the product was heated from 250° C. up to 420° C. in a flow of air only. It was then further fluorinated at 420° C. with a mixture of air and HF (30% of HF) for 6 hours. The quantity of HF introduced into the reactor amounted to 1630 g.

Finally, the mass was cooled down from 420° C. to 200° C. in a current of air only. From the reactor were discharged 1470 g. of fluorinated alumina.

Tests of chlorofluorination of ethylene were then carried out with this fluorinated alumina by following the same operational procedures as described above in Example 4.

The other two active elements were put on the catalyst by placing in the reactor iron bars and bars of AISI 316, and leaving them there during the tests.

Table 7 records the test conditions, the catalyst compositions and the products obtained; Table 8 records the compositions of the recycle.

TABLE 1

| Test Number | 1 | 2 | 3 | 4 | 5 | 6 | 7 | 8 | 9 | 10 | 11 | 12 | 13 |
|---|---|---|---|---|---|---|---|---|---|---|---|---|---|
| Catalyst, percent: | | | | | | | | | | | | | |
| Ni | 0 | 2 | 0 | 0 | 2 | 4 | 2 | 4 | 1 | 0.33 | 0 | 3 | 0.33 |
| Cr | 0 | 0 | 2 | 0 | 1 | 2 | 1 | 2 | 1 | 0.33 | 1 | 3 | 8.5 |
| Fe | 0 | 0 | 0 | 1 | 0 | 0 | 1 | 1 | 0.33 | 0.11 | 1 | 1 | 0.5 |
| Reaction temperature in ° C. | 400 | 400 | 400 | 400 | 400 | 400 | 420 | 430 | 400 | 400 | 400 | 400 | 400 |
| Contact time in seconds | 3 | 3 | 1.5 | 3 | 3 | 3 | 3 | 3 | 3 | 3 | 3 | 2.9 | 3 |
| HF conversion, percent | 83 | 86 | 82 | 35 | 79 | 75 | 46.9 | 56 | 55.9 | 64 | 31.6 | 33.2 | 73 |
| $CF_2Cl-CFCl_2$ conv., percent | 96 | 94 | 89 | 35 | 83 | 83 | 56 | 52 | 65 | 72 | 32.7 | 37.5 | 76.8 |
| Net yields in percent:[1] | | | | | | | | | | | | | |
| In $CF_3CF_2Cl$ | 16 | 3½ | 25 | 1.5 | 18 | 16 | 1 | 3.6 | 6.3 | 10 | 1.3 | 1.7 | 19 |
| In $CF_3CFCl_2$ | 48 | 26 | 18 | 13 | 20 | 15 | 2 | 3.4 | 7.5 | 25.7 | 5.7 | 4.4 | 11.5 |
| In $CF_2Cl-CF_2Cl$ | 8.5 | 16 | 37 | 64 | 46 | 58 | 95 | 86 | 76.2 | 52 | 85 | 84 | 67 |
| In $CF_3-CCl_3$ | 23 | 16 | 9 | 0.1 | 7.7 | 5 | 0.1 | 0.1 | 2.1 | 4.9 | 0.2 | 1.6 | 4.3 |

[1] The difference to reach 100% consists for the greatest part of $C_2F_2Cl_4$ (mixture of isomers).

TABLE 2

| Test Number | 1 | 2 | 3 | 4 | 5 | 6 |
|---|---|---|---|---|---|---|
| Catalyst, percent: | | | | | | |
| Ni | 0 | 2 | 2 | 2 | 2 | 2 |
| Cr | 0 | 0 | 1 | 1 | 1 | 1 |
| Fe | 0 | 0 | 1 | 1 | 0.33 | 1 |
| Reaction temperature in °C | 400 | 400 | 400 | 420 | 400 | 380 |
| Contact time in seconds | 1.7 | 1.5 | 1.5 | 1.5 | 1.5 | 1.5 |
| $Cl_2/HF/C_2H_4$ | 6.1/4.6/1 | 5/4.4/1 | 5.3/4.2/1 | 5.3/4.4/1 | 5/4.4/1 | 4.3/4/1 |
| $C_2H_4$-recycle | 10/1 | 10/1 | 10/1 | 10/1 | 10/1 | 10/1 |
| HF conversion in percent | 86.3 | 88 | 74.5 | 77 | 83 | 85 |
| Net yields in percent: | | | | | | |
| In $C_2F_5Cl$ | 2.4 | 1.8 | | Traces | 1 | Traces |
| In $C_2F_4Cl_2$ | 80 | 74.1 | 6.2 | 31.6 | 61 | 37 |
| In $C_2F_3Cl_3$ | 16.4 | 23.9 | 94 | 67 | 37 | 61 |
| Selectivity in percent: | | | | | | |
| $CF_2Cl-CF_2Cl/C_2F_4Cl_2$ | 11 | 24 | 65 | 54 | 52 | 61 |
| $CF_2Cl-CFCl_2/C_2F_3Cl_3$ | 56 | 45 | 98 | 93 | 85 | 96 |

TABLE 3

| Test Number | 1 | 2 | 3 | 4 | 5 | 6 |
|---|---|---|---|---|---|---|
| Composition of recycle in percent by weight: | | | | | | |
| $C_2F_4Cl_2$ | 0.5 | 0.5 | Traces | Traces | 0.3 | Traces |
| $CF_3-CCl_3$ | 11.4 | 17 | 1.2 | 2 | 5.2 | 1 |
| $CF_2Cl-CFCl_2$ | 13.4 | 14 | 45 | 29 | 27 | 22 |
| $C_2FCl_3$ | 0.7 | 1.4 | 1.3 | 1.1 | Traces | 2.9 |
| $C_2HCl_3$ | 1.5 | 0.8 | 0.6 | Traces | Traces | 2.7 |
| $C_2F_2Cl_4$ | 22.4 | 23.6 | 22.8 | 25.9 | 36.4 | 9.1 |
| $C_2Cl_4$ | 43.5 | 31.2 | 25.7 | 34.8 | 20.1 | 60.5 |
| $C_2FCl_5$ | 5.4 | 7.5 | 3.4 | 5.7 | 8.6 | 1 |
| $C_2Cl_6$ | 1.6 | 3.3 | Traces | 1.4 | 2.3 | Traces |

TABLE 4

| Test Number | 1 | 2 | 3 | 4 | 5 |
|---|---|---|---|---|---|
| Catalyst composition, percent: | | | | | |
| Ni | | 2 | | | 2 |
| Cr | | | 2 | | 1 |
| Fe | | | | 1 | 1 |
| Reaction temperature in °C | 400 | 400 | 400 | 400 | 400 |
| Contact time in seconds | 3 | 3 | 3 | 3 | 3 |
| Conversion in percent | 99 | 97 | 99 | 22 | 52 |
| Net yield in percent: | | | | | |
| In $C_2F_5Cl$ | 4.6 | 14.8 | 12.7 | 6.4 | 3 |
| In $C_2F_4Cl_2$[1] | 23.7 | 13.9 | 17 | 35 | 45 |
| In $CF_3-CCl_3$ | 38.9 | 27.9 | 28 | 7.3 | 0.1 |
| In $C_2F_2Cl_4$ | 32.8 | 43.9 | 42.3 | 50 | 50 |

[1] In Example 5, 70% of the $C_2F_4Cl_2$ consists of $CF_2Cl-CF_2Cl$.

TABLE 5

| Example | 6 | 7 |
|---|---|---|
| Catalyst composition in percent: | | |
| Ni | 0.6 | 0.6 |
| Cr | 0.12 | 0.12 |
| Fe | 0.36 | 0.52 |
| Reaction temperature (°C.) | 450 | 400 |
| Contact time in seconds | 3 | 3 |
| $Cl_2/HF/C_2H_4$ | 5.2/7/1 | 5.2/7/1 |
| Recycle/$C_2H_4$ | 10/1 | 10/1 |
| HF conversion in percent | 60 | 48 |
| Net yield in percent: | | |
| $C_2F_5Cl$ | 3 | 1 |
| $C_2F_4Cl_2$ | 95 | 30.4 |
| $C_2F_3Cl_3$ | 0.8 | 68.3 |
| $CClF_3$ | 1.2 | 0.7 |
| Selectivity in percent: | | |
| $CF_2Cl-CF_2Cl/C_2F_4Cl_2$ | 67 | 77 |
| $CF_2Cl-CFCl_2/C_2F_3Cl_3$ | | 98.6 |

TABLE 6

| Example | 6 | 7 |
|---|---|---|
| Recycle composition in percent by weight: | | |
| $C_2F_4Cl_2$ | 0.8 | 0.3 |
| $CF_3CCl_3$ | 2.4 | 1 |
| $CF_2Cl-CCl_2F$ | 70.1 | 68 |
| $C_2FCl_3$ | Traces | Traces |
| $C_2HCl_3$ | Traces | 0.7 |
| $C_2F_2Cl_4$ | 19.3 | 23.3 |
| $C_2Cl_4$ | 5.5 | 3.8 |
| $C_2FCl_5$ | 1.8 | 2.9 |
| $C_2Cl_6$ | Traces | Traces |

TABLE 7

| Example | 8 | 9 |
|---|---|---|
| Catalyst composition in percent: | | |
| Ni | 0.63 | 0.39 |
| Cr | 2.8 | 2.8 |
| Fe | 0.84 | 0.15 |
| Reaction temperature in °C | 450 | 400 |
| Contact time in seconds | 3 | 3 |
| $Cl_2/HF/C_2H_4$ | 5.4/6.8/1 | 5.2/3.8/1 |
| Recycle/$C_2H_4$ | 10/1 | 10/1 |
| HF conversion in percent | 51.7 | 83.3 |
| Net yields in percent: | | |
| $C_2F_5Cl$ | 0.1 | 0.1 |
| $C_2F_4Cl_2$ | 36.4 | 14.5 |
| $C_2F_3Cl_3$ | 63.2 | 85.1 |
| $CClF_3$ | 0.3 | |
| Selectivity: | | |
| $CF_2Cl-CF_2Cl/C_2F_4Cl_2$ | 65 | |
| $CF_2Cl-CFCl_2/C_2F_3Cl_3$ | 97.9 | 96 |

TABLE 8

| Example | 8 | 9 |
|---|---|---|
| Recycle composition in percent by weight: | | |
| $C_2F_4Cl_2$ | Traces | 0.2 |
| $CF_3CCl_3$ | 1.4 | 1.3 |
| $CF_2Cl-CCl_2F$ | 64.5 | 31.6 |
| $C_2FCl_3$ | 0.7 | Traces |
| $C_2HCl_3$ | Traces | Traces |
| $C_2F_2Cl_4$ | 24.2 | 37.8 |
| $C_2Cl_4$ | 6.4 | 17.5 |
| $C_2FCl_5$ | 2.8 | 9.2 |
| $C_2Cl_6$ | Traces | 2.4 |

What is claimed is:

1. A catalyst for the preparation of fluorinated hydrocarbons by fluorination or chlorofluorination reactions in gaseous phase, consisting essentially of aluminum fluoride containing iron, chromium and preferably also nickel, essentially in the form of halides, oxides or oxy-halides, wherein the quantities of those metallic compounds correspond to the following percentages by weight of metal based on the total: from 0.1% to 5% of Fe, from 0.05% to 8.5% of Cr, and up to 5% of Ni.

2. A catalyst according to claim 1, wherein the halides are the fluorides.

References Cited

UNITED STATES PATENTS

| 2,744,148 | 5/1956 | Ruh et al. | 252—442 X |
| 3,294,852 | 12/1966 | Vecchio et al. | 260—653.7 |
| 3,342,881 | 9/1967 | Sasakura et al. | 260—653.7 |

PATRICK P. GARVIN, Primary Examiner

U.S. Cl. X.R.

260—653, 653.7